(12) United States Patent
Smith (10) Patent No.: US 11,175,483 B2
(45) Date of Patent: Nov. 16, 2021

(54) WIDE FIELD OF VIEW HEAD MOUNTED DISPLAY

(71) Applicant: Sharp Kabushiki Kaisha, Osaka (JP)

(72) Inventor: William Frederick Smith, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 77 days.

(21) Appl. No.: 16/250,216

(22) Filed: Jan. 17, 2019

(65) Prior Publication Data

US 2020/0233189 A1 Jul. 23, 2020

(51) Int. Cl.
*G02B 13/06* (2006.01)
(52) U.S. Cl.
CPC .................. *G02B 13/06* (2013.01)
(58) Field of Classification Search
CPC ...................................... G02B 13/06
USPC ......................................... 359/737
See application file for complete search history.

(56) References Cited

U.S. PATENT DOCUMENTS

| | | | |
|---|---|---|---|
| 5,768,024 A | 6/1998 | Takahashi | |
| 6,185,045 B1* | 2/2001 | Hanano | G02B 27/0172 359/630 |
| 7,580,192 B1 | 8/2009 | Chu et al. | |
| 8,724,229 B2 | 5/2014 | Takahashi | |
| 9,244,277 B2 | 1/2016 | Cheng et al. | |
| 2001/0048561 A1* | 12/2001 | Heacock | G02B 27/0172 359/631 |
| 2014/0146394 A1* | 5/2014 | Tout | G02B 27/017 359/630 |
| 2017/0115489 A1 | 4/2017 | Hu et al. | |
| 2017/0186231 A1 | 6/2017 | Petrov | |

* cited by examiner

*Primary Examiner* — Thomas K Pham
*Assistant Examiner* — Mitchell T Oestreich
(74) *Attorney, Agent, or Firm* — Renner, Otto, Boisselle & Sklar, LLP (57) ABSTRACT

A wide field view display device has an enhanced FOV while maintaining a simplified and compact configuration. The wide field of view display includes a display device configured to emit a central set of rays and a peripheral set of rays, and an optics block. The optics block includes a central lens region configured to direct the central set of rays to a central image point, and a prism coupled to a periphery of the central lens region, wherein the prism is configured to direct the peripheral set of rays to a peripheral image point. The prism includes an entry surface that is configured to refract the peripheral set of rays to direct the peripheral set of rays to the reflecting surface; a reflecting surface that is configured to reflect the peripheral set of rays to the exit surface, and an exit surface that is configured to refract the peripheral set of rays to direct the peripheral set of rays to the peripheral image point.

16 Claims, 5 Drawing Sheets

WIDE FIELD OF VIEW HEAD MOUNTED DISPLAY

TECHNICAL FIELD

The present disclosure relates generally to display devices, and more specifically to wearable displays that create a panoramic field of view (FOV) in a head mounted display device.

BACKGROUND ART

A conventional head mounted display (HMD) can be used to display a virtual world to a user with a FOV around 110°. Attempts to increase the immersivity experienced by a user by providing a FOV over 180° have been large and expensive. The increase in size and expense of wider FOV HMDs arises partly because the optical components that direct the light paths, such as mirrors in particular, must be fabricated separately and positioned at precise locations in an HMD. The result is a panoramic HMD that is more complex and has numerous optical components compared to conventional HMDs. As a result, size and cost deter the adoption and regular usage of panoramic HMDs, leaving users limited to a virtual world where they can see far less than their eyes can see.

Conventional approaches have been described for HMDs that provide a wider FOV using mirrors. In one approach, US 2017/0186231 (Petrov, published Jun. 29, 2017) describes an HMD design in which, for each eye, two curved mirrors and two additional display elements may augment the central optics to extend the FOV.

Conventional approaches have also been described for HMDs that provide a wider FOV using free-form prisms that increase manufacturing complexity. For example, U.S. Pat. No. 5,768,024 (Takahashi, issued Jun. 16, 1998) describes how curving the entry and exit surfaces of an ocular optical system may be combined with a single total internal reflection for each ray to focus and redirect light from a screen to an eye. U.S. Pat. No. 8,724,229 (Takahashi, issued May 13, 2014) describes a decentered optical system in which total internal reflection can occur more than once within a prism and that uses additional external lenses to achieve increased optical performance.

Several conventional approaches have been described for HMDs that provide a wider FOV using augmented central optics. For instance, US 2017/0115489 (Hu et al., published Apr. 27, 2017) describes a conventional central lens fused to a peripheral lens for each eye. Both lenses may focus light from a curved screen. In another approach, U.S. Pat. No. 9,244,277 (Cheng et al., issued Jan. 26, 2016) describes an HMD in which a large field of view is achieved by tiling many prisms. In this approach, the central field and the peripheral field are provided by the same type of prism.

Other conventional approaches in related fields include collimating light emitted from a light emitting diode (LED) by using a central lens and a peripheral prism. For example, U.S. Pat. No. 7,580,192 (Chu et al., issued Aug. 25, 2009) describes an LED collimation lens in which centrally emitted light passes through a lens and light emitted to the sides of the LED collimation lens enters a rotationally symmetric prism and undergoes total internal reflection (TIR) once before leaving.

SUMMARY OF INVENTION

The present invention provides designs for a panoramic HMD with a panoramic FOV, and in particular a FOV above 180° in exemplary embodiments. The designs described add optical components but retain a comparatively small overall size. As in a conventional HMD, a central set of rays leave a display screen, pass through one or more lenses, enter the eyes of a user, and are absorbed by the retina in the region corresponding to the center of the user's vision. Unlike a conventional HMD, a peripheral set of rays from a side of the display screen or from one or more secondary screens may enter one or more prisms and be reflected at least once, before leaving the prisms and arriving at the peripheral vision part of the retina of a user.

To increase the FOV of a panoramic HMD while maintaining a simple and compact arrangement, embodiments described herein use a single optical block for each eye of a user. The optical block may include a central lens and a prism coupled to the periphery of the central lens. In some embodiments, the prism can be a total internal reflection (TIR) prism. Each optical block can be positioned to direct a central set of rays and a peripheral set of rays from a display screen to a retina of a user. The central lens of the optical block may direct the central set of rays to the region of the retina of the user that corresponds to the central region of a FOV of the user. The prism of the optical block may direct the peripheral set of rays to a region of the retina of the user associated with the peripheral FOV of the user.

This approach has several advantages. The exit surfaces of the prisms can be at an angle of up to 90° from the lens, allowing them to wrap around the eye and increase the FOV. A single screen can be used for the entire system, or separate screens can be used for the central FOV and the peripheral FOV if preferred. For example, a first screen can provide the central set of rays that are absorbed by the regions of the retina of a user corresponding to the center of the user's vision, and one or more peripheral screens can emit the peripheral set of rays absorbed by the regions of the retina of a user corresponding to the periphery of their vision. The lenses and prisms can be designed in a manner that yields a higher angular resolution in the center of the FOV of a user than the periphery, thus more closely matching the resolution of the eye of a user.

An aspect of the invention, therefore, is a wide field view display device having an enhanced FOV while maintaining a simplified and compact configuration as compared to conventional configurations. In exemplary embodiments, the wide field of view display includes a display device configured to emit a central set of rays and a peripheral set of rays, and an optics block. The optics block includes a central lens region configured to direct the central set of rays to a central image point, and a prism coupled to a periphery of the central lens region, wherein the prism is configured to direct the peripheral set of rays to a peripheral image point. The prism includes an entry surface that is configured to refract the peripheral set of rays to direct the peripheral set of rays to the reflecting surface; a reflecting surface that is configured to reflect the peripheral set of rays to the exit surface, and an exit surface that is configured to refract the peripheral set of rays to direct the peripheral set of rays to the peripheral image point.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DESCRIPTION OF EMBODIMENTS

Embodiments of the present invention will now be described with reference to the drawings, wherein like reference numerals are used to refer to like elements throughout. It will be understood that the figures are not necessarily to scale.

Conventional HMDs

Figure 1:
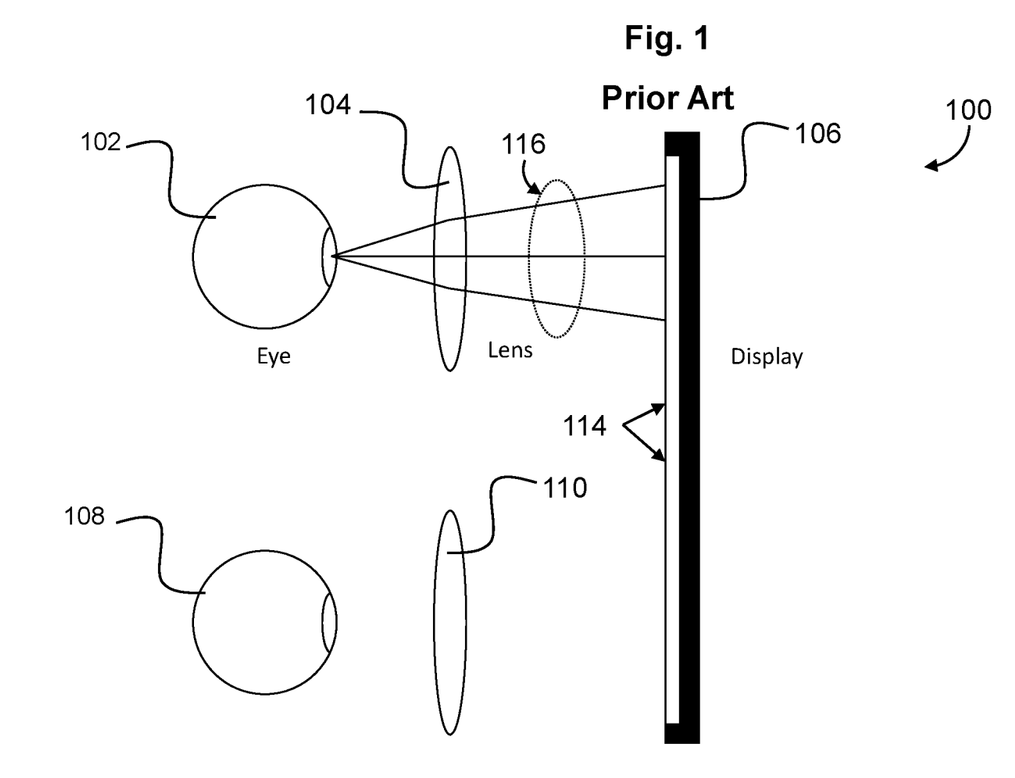
FIG. 1 is a schematic drawing depicting a display arrangement in a conventional HMD.

To better understand the distinctions and advantages of the present invention, comparison is made to conventional HMD configurations. FIG. 1 is a schematic drawing depicting a display arrangement in a conventional HMD 100. The conventional HMD 100 can include a display 106, a first lens 104 associated with a first eye 102 of a user, and a second lens 110 associated with a second eye 108 of the user. The display 106 can show two images 114 side by side. The light 116 from the two images can be collimated by the first lens 104 and the second lens 110 to allow the eyes to focus at a comfortable distance. The conventional HMD 100 limits the FOV associated with the eyes of a user to approximately 110°. Humans have approximately a 210° horizontal FOV, and the limited FOV in conventional HMDs decreases the immersivity and realism of the experience of a user. Systems and methods are needed to improve the field of view in HMDs.

Figure 2:
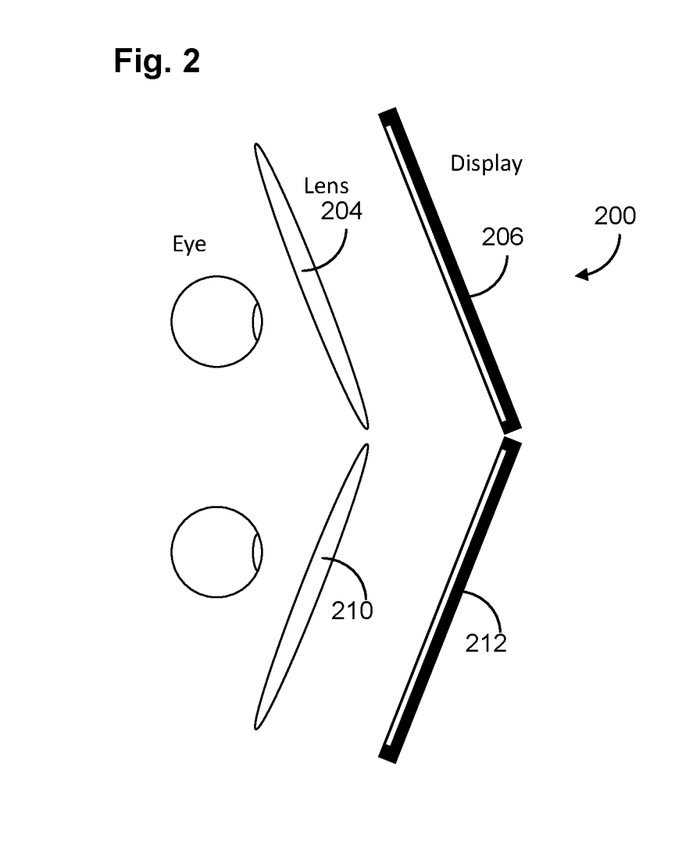
FIG. 2 is a schematic drawing depicting a first conventional technique to increase the field of view in an HMD.

FIG. 2 is a schematic drawing depicting a first conventional technique to increase the field of view in a conventional HMD 200. Conventional techniques to increase the FOV shown in FIG. 2 include increasing the size of the optical components and increasing the number of displays. HMD 200 includes a larger first lens 204 and a larger second lens 210 as compared to the lenses in the base configuration of FIG. 1. Although the FOV is improved, the larger lenses increase the size and weight of the HMD 200 and increase optical aberrations. To reduce aberrations, the focal length can be increased to accommodate the larger lens size and maintain a constant F-number. As a result, the increase in focal length will increase the size of the HMD and reduce the appeal of the device to a user.

Figure 3:
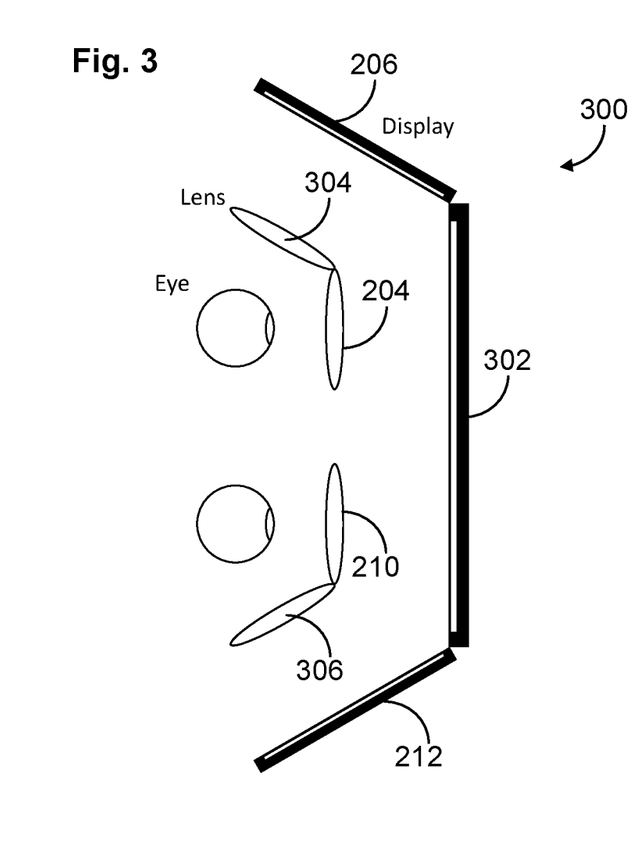
FIG. 3 is a schematic drawing depicting a second conventional technique to increase the field of view in an HMD.

In addition to increased lens size, the HMD 200 may include a first display 206 and a second display 212. Both the screens and lenses can be tilted to increase the total FOV. The number, size, and position of additional screens may vary, but the approach leads to increased size, complexity, and cost over a single screen design. FIG. 3 is a schematic drawing depicting a second conventional technique to increase the field of view in another conventional HMD 300. The conventional HMD 300 uses a third screen 302, a third lens 304, and a fourth lens 306 to increase the field of view. Again, the increased number of conventional components and associated alignment requirements leads to increased size, complexity, and cost over the conventional HMD design of FIG. 1.

Wide Field of View HMD Using TIR Prisms

Accordingly, there is a need in the art for improved systems and methods to increase the FOV in HMDs. The embodiments described herein use a single optical block for each eye of a user. The optical block may include a central lens and a prism coupled to the periphery of the central lens. In some embodiments, the prism can be a total internal reflection (TIR) prism. Each optical block can be positioned to direct a central set of rays and a peripheral set of rays from a display screen to a retina of a user. The central lens of the optical block may direct the central set of rays to the region of the retina of the user that corresponds to the central region of a FOV of the user. The prism of the optical block may direct the peripheral set of rays to a region of the retina of the user associated with the peripheral FOV of the user.

Figure 4:
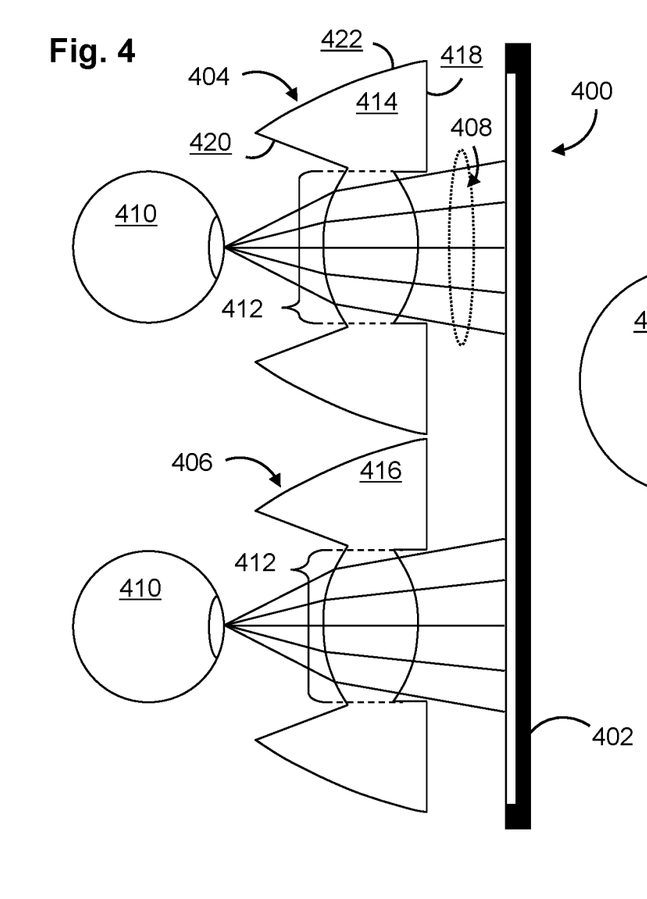
FIG. 4 is a cross-sectional drawing depicting an optics block directing central rays from a display device according to embodiments of the present invention.

The present invention relates to a panoramic display that can improve the field of view in HMDs. Turning to FIG. 4, a cross-sectional drawing depicting an optics block directing central rays from a display device according to embodiments of the present invention is shown. The HMD 400 includes a display device 402, a first optics block 404, and a second optics block 406. The display device 402 may include one or more screens. Each screen may include a plurality of pixels. In some embodiments, the pixels can be components of a light-emitting display device such as for example an organic light-emitting diode (OLED), a micro LED, a quantum dot LED, a liquid crystal display, and the like. The first optics block 404 and the second optics block 406 may be positioned in the HMD 400 to direct a central set of light rays 408 to each eye 410 of a user. The first optics block 404 and the second optics block 406 include a central lens region 412 configured to direct the central set of rays 408 to a central image point corresponding to the central FOV of the eye 410 of a user. In some embodiments, the central lens region 412 can be configured to form a central FOV of approximately 100°.

In contrast with conventional wide FOV HMDs, the central lens region 412 can be small compared to the large lenses illustrated in FIGS. 1-3. In some embodiments, the central lens region 412 may be less than 50 mm in diameter. The large lenses in FIGS. 1-3 need to form a wide FOV greater than 110° and may create higher levels of aberrations when compared to a smaller lens forming a smaller FOV. In some embodiments, the central lens region 412 may be configured to provide a field of view less than 110°. The reduced size of the central lens region 412 improves the image quality for the central FOV, and thus improves the immersivity experienced by the user.

The first optics block 404 and the second optics block 406 may include a first prism 414 and a second prism 416 respectively. In each optics block, the prism 414/416 is coupled to a periphery of the central lens region 412. The first prism 414 and the second prism 416 may be rotationally symmetric around the central lens region 412. Each prism includes an entry surface 418, an exit surface 420, and a reflecting surface 422. The entry surface 418 can be characterized by an angle relative to one or more of the display screen and the reflecting surface 422. The reflecting surface 422 can be characterized by an angle relative to one or more of the entry surface 418 and the exit surface 420. The exit surface 420 can be characterized by an angle relative to one or more of the reflecting surface 422 and the central lens region 412.

A benefit of using a prism fixed to the central lens region 412 includes fixing the angles formed by the entry surface 418, the exit surface 420, the reflecting surface 422, and the central lens region 412 during molding. The optics block can be molded to form the prism in combination with the central lens region in one stage, thus eliminating additional steps such as coating, polishing alignment, and the like. In some embodiments, an optics block for prototyping or a mold for mass manufacture can be made by methods such as diamond turning. The optics block may be manufactured using polycarbonate, acrylic, glass, and the like. In some embodiments, the optics block can be manufactured using a plurality of materials with varying refractive indices.

For example, the central lens region 412 may be fabricated using a first material with a first refractive index, and the first prism 414 and the second prism 416 may be fabricated using a second material with a second refractive index different from the first refractive index. Adjusting the refractive indices of the central lens region 412 and the prism molded to the central region 412 may reduce aberrations such as distortion, contrast, and color correction in the image formed by the optical block. To further reduce optical aberrations, the entry surface 418, the exit surface 420, and the reflecting surface 422 of the prisms can be curved. Furthermore, the system may be optically symmetric to reflect both the central set of rays 408 and a peripheral set of rays.

Figure 5:
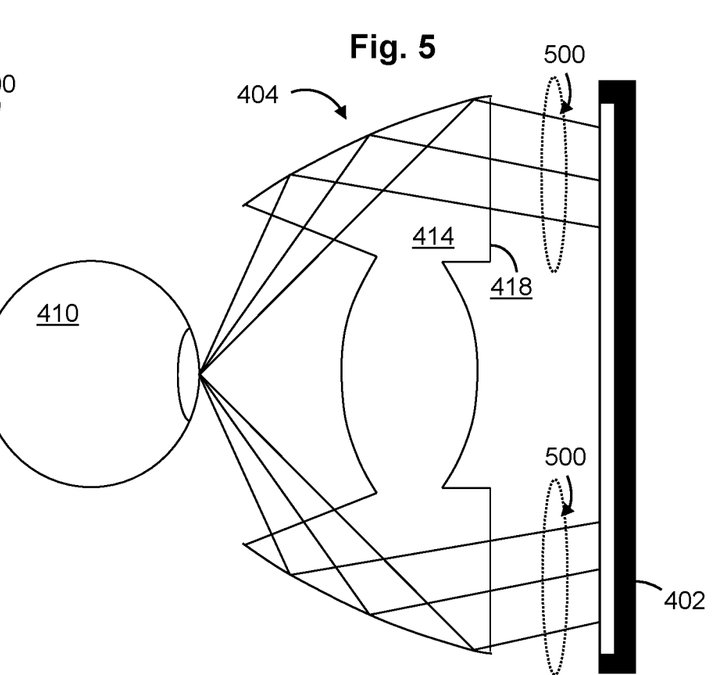
FIG. 5 is a cross-sectional drawing depicting an optics block directing peripheral rays from a display device according to embodiments of the present invention.

FIG. 5 is a cross-sectional drawing depicting an optics block directing peripheral rays from a display device according to embodiments of the present invention. For simplicity, FIG. 5 shows only the first optics block 404, and it will be appreciated that the second optics block 406 will operate comparably in directing peripheral rays. Accordingly, the structure and design described with respect to the first optics block 404 can also be applied to the second optics block 406. FIG. 5 shows the first entry surface 418, the exit surface 420, and the reflecting surface 422 of the first prism 414. The peripheral set of rays 500 strikes three surfaces of the first optics block 404 to be directed to the eye 410 of the user. The entry surface 418 is configured to refract the peripheral set of rays through the surface toward the reflecting surface 422. The entry surface 418 may be configured to refract the peripheral set of rays 500 to strike the reflecting surface 422 at or above a critical angle such that the peripheral set of rays 500 is directed by the reflecting surface 422 to the exit surface 420. The exit surface 420 may be configured such that the peripheral set of rays 500 is refracted to a peripheral image point corresponding to the regions of the eye 410 of the user associated with the peripheral FOV. In exemplary embodiments, first prism 414 may be a TIR prism.

Unlike conventional wide FOV HMDs, curved mirrors are not necessary to reflect the peripheral set of rays 500. The use of curved mirrors in an off-axis configuration may introduce aberrations such as astigmatism. Furthermore, alignment with other optical components is particularly crucial for mirrors. In addition, mirrors require a metal coating stage during manufacture as well as a polishing stage. The molding of the first optics block 404 may eliminate the alignment, coating, and polishing steps associated with mirrors by using TIR prisms. The first optics block 404 can be manufactured to incorporate a TIR prism to direct the peripheral set of rays 500 with no additional coating, polishing or alignment steps after molding. The alignment of the first prism 414 and the central lens region 412 is fixed by the molding and turning of the first optics block 404. Additionally, the first prism 414 provides three surfaces to shape and direct the peripheral rays. The use of the optics block 414 simplifies manufacture of an HMD by eliminating the use of separate mirrors and the associated alignment within the system. As referenced above, comparable principles are applicable to the manufacture and structure of the second optics block 406.

Figure 6:
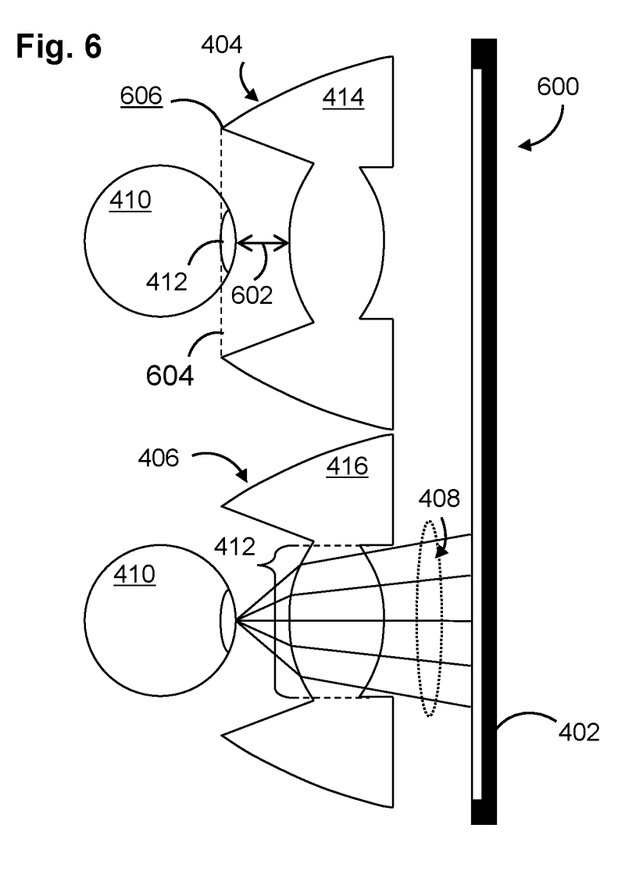
FIG. 6 is a cross-sectional drawing depicting an optics block directing central rays from a display device according to embodiments of the present invention.
Figure 7:
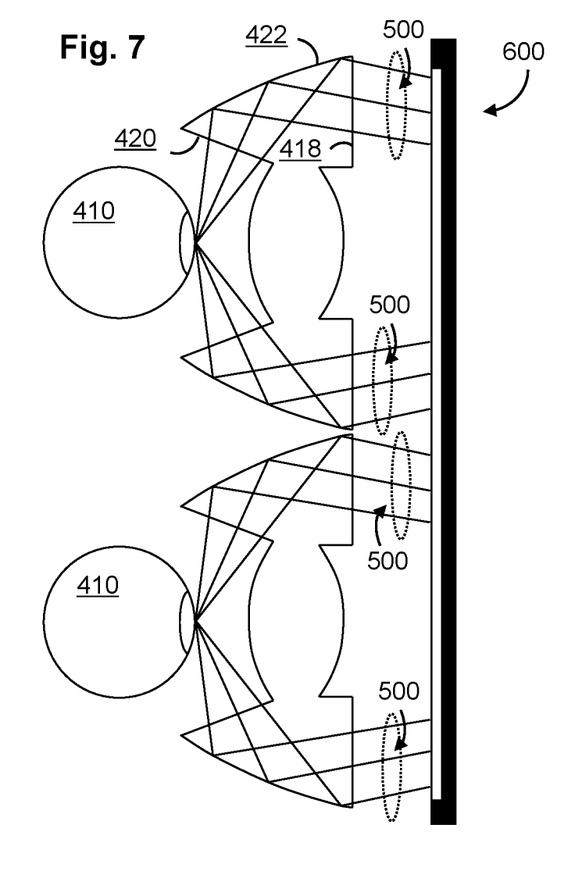
FIG. 7 is a cross-sectional drawing depicting an optics block directing peripheral rays from a display device according to embodiments of the present invention.

FIGS. 6 and 7 depict another embodiment of the present invention. FIG. 6 is a cross-sectional drawing depicting an optics block directing central rays from a display device according to embodiments of the present invention. The HMD 600 includes the display device 402, the first optics block 404, and the second optics block 406. The HMD 600 design positions the optics blocks a distance 602 from the eye 410 of the user so that a pupil 412 of the eye 410 lies forward of a plane 604 corresponding to the prism edge 606. This allows a greater than 180° FOV to be achieved.

FIG. 7 is a cross-sectional drawing depicting directing peripheral rays from a display device by an optics block of FIG. 6 according to embodiments of the present invention. The entry surface 418, the exit surface 420, and the reflecting surface 422 of the first prism 414 may be modified to direct the peripheral set of rays 500 to form the peripheral image portions of a 180° FOV. For example, the entry surface 418 can be modified to refract the peripheral set of rays 500 at an angle that results in total internal reflection off the reflecting surface 422. In some embodiments, the reflecting surface 422 can be curved to form an incident angle that reflects the peripheral set of rays 500. Additionally, the material used to manufacture the first prism 414 can be a high refractive index material such as MR™-174 resin material. In some embodiments, the refractive index is greater than 1.49. The distance 602 of the optical blocks from the eye 410 of the user can be adjusted to provide the 180° FOV. In some embodiments, the reflecting surface 422 can include a reflective coating such as evaporated aluminum. Essentially, a combination of curvature to achieve TIR and higher refractive index materials permits a closer eye positioning relative to the HMD device.

In some embodiments, the optics block can be a rotationally symmetric system with a 180° horizontal field of view and a 180° vertical field of view. The 180° vertical field may be greater than the human visual field and the vertical height of the display screen 402 screen may be reduced. In these embodiments, the optics block mold may be used to form an optics block without the sections of the optics block that would direct rays outside the FOV of a user.

Figure 8:
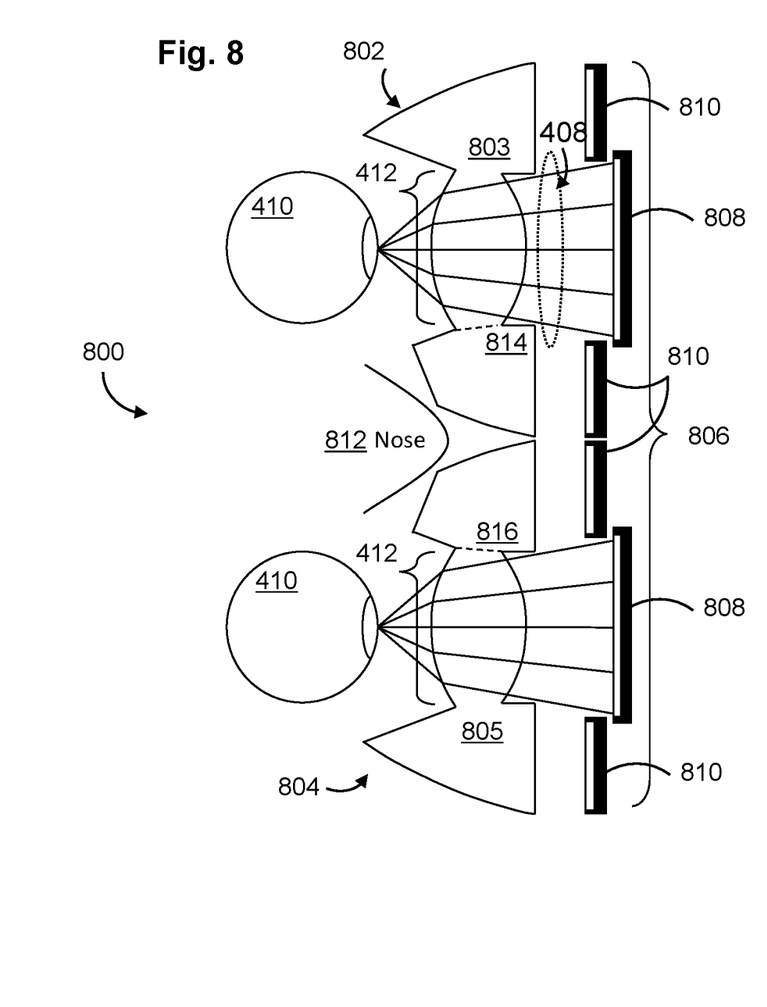
FIG. 8 is a cross-sectional drawing depicting an optics block directing central rays from a display device according to embodiments of the present invention.
Figure 9:
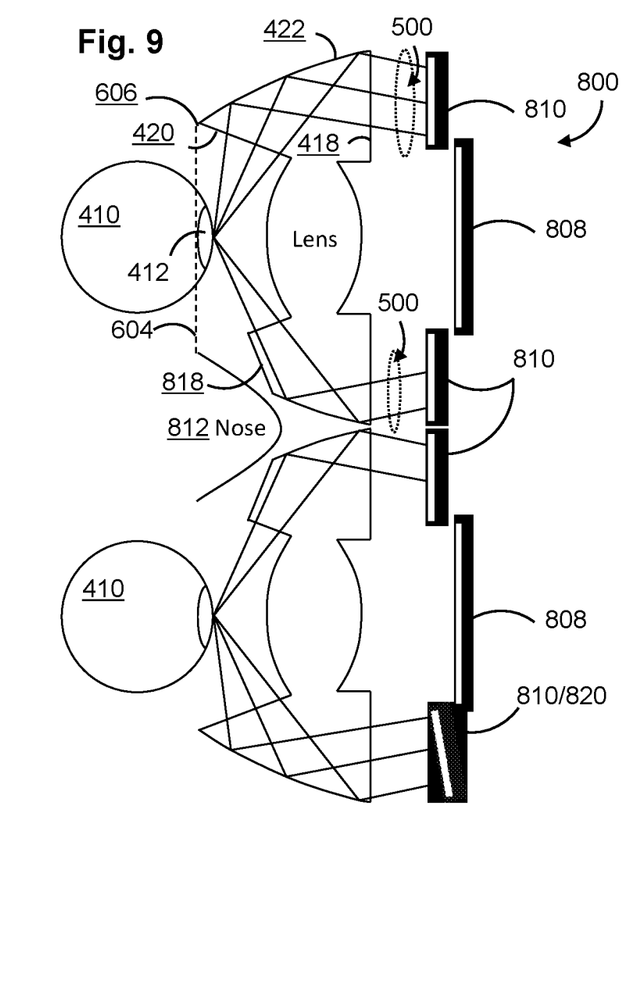
FIG. 9 is a cross-sectional drawing depicting an optics block directing peripheral rays from a display device according to embodiments of the present invention.

FIGS. 8 and 9 depict another embodiment of the present invention that modifies the optics blocks and the display screens. FIG. 8 is a cross-sectional drawing depicting an optics block directing central rays from a display device according to embodiments of the present invention. HMD 800 shows an embodiment with a section on one side of each optics block removed relative to previous embodiments. HMD 800 includes a first optics block 802, a second optics block 804 and a display device 806. In exemplary embodiments the display device 806 may include a plurality of screens such as central screens 808 and peripheral screens 810. FIGS. 8 and 9 show the HMD 800 with six display units to provide images to the central and peripheral image points of the eyes 810 of the user. The central screens 808 may have a first resolution associated with the central FOV of the user, and the peripheral screens may have a second resolution associated with the peripheral FOV of the user. The first resolution may be greater than the second resolution. Such configuration thus constitutes a six-screen arrangement for the HMD device, including a central screen and two peripheral screens, one positioned on each side of the central screen, for each eye.

The first optics block 802 and the second optics block 804 may include a first prism 803 and a second prism 805 respectively. The first prism 803 and the second prism 805 may have a section removed to account for the position of a nose 812 of the user. A first truncated prism section 814 and a second truncated prism section 816 may be formed by removing a portion of the first prism 803 and a portion of the second prism 805. The truncated prism sections optimize positioning of the HMD device relative to the user's nose 812. In some embodiments, the optics blocks may be formed with the first truncated prism section 814 and the second truncated prism section 816 as part of the molding process. The truncated sections allow the optics blocks to sit close to the eyes 410 of the user and still provide a wide FOV and a compact overall size. The central lens regions 412 of the first optics block 802 and the second optics block 804 are shown directing the central set of rays 408 from the central screens 808 to the eyes 410 of the user.

FIG. 9 is a cross-sectional drawing depicting an optics block of FIG. 8 directing peripheral rays from a display device according to embodiments of the present invention. HMD 800 is shown in FIG. 9 with the first optics block 802 and the second optics block 804. The first truncated prism section 814 and the second truncated prism section 816 allow the pupil 412 to be forward of the plane 604 corresponding to the prism edge 606. The peripheral screens 810 can be positioned to emit the peripheral set of rays 500 to the first prism 803 and the second prism 805. Like the optics blocks of the various embodiments described herein, the first prism 803 and the second prism 805 can include the entry surface 418, the exit surface 420, and the reflecting surface 422. The first truncated prism section 814 and the second truncated prism section 816 may include a fourth surface 818 configured to refract any rays of the peripheral image that would be blocked by the nose 812 of the user toward the user's peripheral FOV.

The optics blocks in HMD 800 can be positioned sufficiently close to the eyes 410 of the user such that the unnecessary portions of the prisms at the top and bottom of each optical block may be removed. The top and bottom portions of the optics block may form a vertical FOV that exceeds the vertical FOV of the eye of the user and may be removed without decreasing the immersivity provided by HMD 800. In some embodiments with the top and bottom portions of the optics block removed, the peripheral screens 810 may be rectangular screens. The peripheral screens 810 may be positioned in a different plane than the central screens 808 and may also be rotated 820 relative to the central screens 808 for an increase in optical performance. In some embodiments, positioning the peripheral screens 810 in the different plane and/or rotated 820 may increase the resolution of the HMD 800 and decrease in-field curvature discontinuities.

In the various embodiments of the present invention, a prism provides the peripheral FOV and a central lens provides the central FOV for each eye of a user. The prisms may have an entry and exit surface that may be set during manufacture for optimal eye positioning, as well as a reflecting surface. To reduce aberrations, the optics may be formed as one aligned unit, and a pupil of a user may sit forward of an edge of the prism thus allowing for a horizontal binocular FOV greater than 180° while maintaining a simplified and more compact structure as compared to conventional configurations.

An aspect of the invention, therefore, is a wide FOV display comprising a display device configured to emit a central set of rays and a peripheral set of rays. In exemplary embodiments, the wide FOV display includes an optics block comprising a central lens region configured to direct the central set of rays to a central image point and a prism coupled to a periphery of the central lens region, wherein the prism is configured to direct the peripheral set of rays to a peripheral image point. The wide FOV display may include one or more of the following features, either individually or in combination.

In an exemplary embodiment, the prism comprises an entry surface for entry of the peripheral set of rays, a reflecting surface that reflects the peripheral set of rays, and an exit surface for exit of the peripheral set of rays toward the peripheral image point.

In an exemplary embodiment, the entry surface is configured to refract the peripheral set of rays to direct the peripheral set of rays to the reflecting surface, the reflecting surface is configured to reflect the peripheral set of rays to the exit surface, and the exit surface is configured to refract the peripheral set of rays to direct the peripheral set of rays to the peripheral image point.

In an exemplary embodiment, the central lens region has a first refractive index and the prism has a second refractive index different from the first refractive index.

In an exemplary embodiment, the display device further comprises a central screen operable to emit one or more rays of the central set of rays and a peripheral screen operable to emit one or more rays of the peripheral set of rays. In an exemplary embodiment, the peripheral screen is rotated relative to the central screen.

In an exemplary embodiment, the wide field of view display further comprises a second optics block comprising a second central lens region configured to direct a second central set of rays to a second central image point and a second prism coupled to a periphery of the second central lens region, wherein the second prism is configured to direct a second set of peripheral rays to a peripheral image point, and wherein the display device is configured to emit the second central set of rays and the second set of peripheral rays.

In an exemplary embodiment, the wide field of view display further comprises one or more truncated prism sections.

In an exemplary embodiment, the central set of rays has a higher angular resolution than the peripheral set of rays.

Another aspect of the invention is an optics block comprising a central lens region configured to direct a central set of rays to a central image point and a prism coupled to the periphery of the central lens region, wherein the prism is configured to direct a peripheral set of rays to a peripheral image point. In an exemplary embodiment, the prism further comprises an entry surface for entry of the peripheral set of rays, a reflecting surface that reflects the peripheral set of rays, and an exit surface for exit of the peripheral set of rays toward the peripheral image point. The optics block may include one or more of the following features, either individually or in combination.

In an exemplary embodiment, the entry surface is configured to refract the peripheral set of rays to direct the peripheral set of rays to the reflecting surface, the reflecting surface is configured to reflect the peripheral set of rays to the exit surface, and the exit surface is configured to refract the peripheral set of rays to direct the peripheral set of rays to the peripheral image point.

In an exemplary embodiment, a first angle between the entry surface and the reflecting surface is fixed, a second angle between the reflecting surface and the exit surface is fixed, and a third angle between the exit surface and the central lens region is fixed.

In an exemplary embodiment, the central lens region has a first refractive index and the prism has a second refractive index different from the first refractive index.

In an exemplary embodiment, the optics block further comprises one or more truncated prism sections.

In an exemplary embodiment, the central set of rays has a higher angular resolution than the peripheral set of rays.

Another aspect of the invention is a method of displaying an image comprising emitting a central set of rays to an optics block, directing the central set of rays to a central image point with a central lens region of the optics block, emitting a peripheral set of rays, refracting, at a first angle, the peripheral set of rays with an entry surface of a prism of the optics block, reflecting, at a second angle, the peripheral set of rays with a reflecting surface of the prism, refracting, at a third angle, the peripheral set of rays to a peripheral image point with an exit surface of the prism. The method of displaying may include one or more of the following features, either individually or in combination.

In an exemplary embodiment, the method of displaying an image includes directing the central set of rays is determined by a first refractive index of the central lens region.

In an exemplary embodiment, the first angle, the second angle, and the third angle are determined by a second refractive index of the prism that is different from the first refractive index.

In an exemplary embodiment, the central set of rays has a higher angular resolution than the peripheral set of rays.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

INDUSTRIAL APPLICABILITY

Embodiments of the present invention are applicable to many display devices in which an enhanced FOV may be desirable, including portable electronic display devices, and including in particular head mounted display devices that may be used in virtual reality (VR) and/or augmented reality (AR) applications.

REFERENCE SIGNS LIST

100—conventional HMD
102—first eye
104—first lens
106—display
108—second eye
110—second lens
114—two images
116—image light
200—conventional HMD
204—larger first lens
206—first display
210—larger second lens
212—second display
300—conventional HMD
302—third screen
304—third lens
306—fourth lens
400—HMD
402—display device
404—first optics block
406—second optics block
408—light rays
410—eye
412—central lens region
414—first prism
416—second prism
418—entry surface
420—exit surface
422—reflecting surface
500—peripheral set of rays
600—HMD
602—distance from eye
604—plane of prism edge
606—prism edge
800—HMD
802—first optics block
803—first prism
804—second optics block
805—second prism
806—display device
808—central screens
810—peripheral screens
812—nose
814—first truncated prism section
816—second truncated prism section
818—fourth surface
820—rotated position

What is claimed is:
1. A wide field of view display comprising:
a display device configured to emit a central set of rays and a peripheral set of rays; and
an optics block comprising:
a central lens region configured to direct the central set of rays to a central image point; and
a prism coupled to a periphery of the central lens region, wherein the prism is configured to direct the peripheral set of rays to a peripheral image point that is different from the central image point and located peripherally relative to the central image point;

wherein the optics block is an integral component in which the central lens region and the prism are directly fixed to each other with the central lens region and the prism being in direct contact with each other;

wherein the prism comprises:

an entry surface for entry of the peripheral set of rays;

a reflecting surface that reflects the peripheral set of rays; and an exit surface for exit of the peripheral set of rays toward the peripheral image point; and wherein:

the entry surface is configured to refract the peripheral set of rays to direct the peripheral set of rays to the reflecting surface;

the reflecting surface is configured to reflect the peripheral set of rays to the exit surface; and the exit surface is configured to refract the peripheral set of rays to direct the peripheral set of rays to the peripheral image point;

wherein the reflecting surface and the exit surface are positioned such that the peripheral set of rays is incident on the reflecting surface and the exit surface only once each.

2. The wide field of view display of claim 1 wherein the central lens region has a first refractive index and the prism has a second refractive index different from the first refractive index.

3. The wide field of view display of claim 1 wherein the display device further comprises:

a central screen operable to emit one or more rays of the central set of rays; and a peripheral screen operable to emit one or more rays of the peripheral set of rays.

4. The wide field of view display of claim 3 wherein the peripheral screen is rotated relative to the central screen.

5. The wide field of view display of claim 1 further comprising a second optics block comprising:

a second central lens region configured to direct a second central set of rays to a second central image point; and a second prism coupled to a periphery of the second central lens region, wherein the second prism is configured to direct a second set of peripheral rays to a peripheral image point, and wherein the display device is configured to emit the second central set of rays and the second set of peripheral rays.

6. The wide field of view display of claim 1 further comprising one or more truncated prism sections.

7. The wide field of view display of claim 1 wherein the central set of rays has a higher angular resolution than the peripheral set of rays.

8. An optics block comprising:

a central lens region configured to direct a central set of rays to a central image point; and a prism coupled to a periphery of the central lens region, wherein the prism is configured to direct a peripheral set of rays to a peripheral image point that is different from the central image point and located peripherally relative to the central image point;

wherein the optics block is an integral component in which the central lens region and the prism are directly fixed to each other with the central lens region and the prism being in direct contact with each other;

wherein the prism comprises:

an entry surface for entry of the peripheral set of rays;

a reflecting surface that reflects the peripheral set of rays; and an exit surface for exit of the peripheral set of rays toward the peripheral image point; and wherein:

the entry surface is configured to refract the peripheral set of rays to direct the peripheral set of rays to the reflecting surface;

the reflecting surface is configured to reflect the peripheral set of rays to the exit surface; and the exit surface is configured to refract the peripheral set of rays to direct the peripheral set of rays to the peripheral image point;

wherein the reflecting surface and the exit surface are positioned such that the peripheral set of rays is incident on the reflecting surface and the exit surface only once each.

9. The optics block of claim 8 wherein:

a first angle between the entry surface and the reflecting surface is fixed;

a second angle between the reflecting surface and the exit surface is fixed; and a third angle between the exit surface and the central lens region is fixed.

10. The optics block of claim 8 wherein the central lens region has a first refractive index and the prism has a second refractive index different from the first refractive index.

11. The optics block of claim 8 further comprising one or more truncated prism sections.

12. The optics block of claim 8 wherein the central set of rays has a higher angular resolution than the peripheral set of rays.

13. A method of displaying an image comprising:

emitting a central set of rays to an optics block;

directing the central set of rays to a central image point with a central lens region of the optics block;

emitting a peripheral set of rays;

refracting, at a first angle, the peripheral set of rays with an entry surface of a prism of the optics block, wherein the optics block is an integral component in which the central lens region and the prism are directly fixed to each other with the central lens region and the prism being in direct contact with each other;

reflecting, at a second angle, the peripheral set of rays with a reflecting surface of the prism; and refracting, at a third angle, the peripheral set of rays to a peripheral image point with an exit surface of the prism, wherein the peripheral image point is different from the central image point and located peripherally relative to the central image point;

wherein the reflecting surface and the exit surface are positioned such that the peripheral set of rays is incident on the reflecting surface and the exit surface only once each.

14. The method of claim 13 wherein:

directing the central set of rays is determined by a first refractive index of the central lens region;

the first angle, the second angle, and the third angle are determined by a second refractive index of the prism that is different from the first refractive index; and the central set of rays has a higher angular resolution than the peripheral set of rays.

15. The wide field of view display of claim 1, wherein the direct contact of the central lens region and the prism is positioned such that the central set of rays and the peripheral set of rays do not cross where the central lens region and the prism are in direct contact with each other.

16. The optics block of claim 8, wherein the direct contact of the central lens region and the prism is positioned such that the central set of rays and the peripheral set of rays do not cross where the central lens region and the prism are in direct contact with each other.

* * * * *